(12) United States Patent
Baugh

(10) Patent No.: US 10,619,781 B2
(45) Date of Patent: Apr. 14, 2020

(54) METHOD OF SUBSEA PIPELINE BLOCKAGE REMEDIATION

(71) Applicant: Benton Frederick Baugh, Houston, TX (US)

(72) Inventor: Benton Frederick Baugh, Houston, TX (US)

( * ) Notice: Subject to any disclaimer, the term of this patent is extended or adjusted under 35 U.S.C. 154(b) by 0 days.

(21) Appl. No.: 15/625,078

(22) Filed: Jun. 16, 2017

(65) Prior Publication Data

US 2018/0363823 A1 Dec. 20, 2018

(51) Int. Cl.
*E21B 36/00* (2006.01)
*F16L 53/32* (2018.01)

(52) U.S. Cl.
CPC .................................... *F16L 53/32* (2018.01)

(58) Field of Classification Search
CPC .. E21B 36/005; E21B 41/0007; F16L 53/002; F16L 53/32
See application file for complete search history.

(56) References Cited

U.S. PATENT DOCUMENTS

| | | | |
|---|---|---|---|
| 4,679,598 A * | 7/1987 | Jee | E21B 43/01 138/103 |
| 6,415,866 B1 | 7/2002 | Baugh | |
| 6,939,082 B1 * | 9/2005 | Baugh | B08B 7/0071 138/32 |
| 7,036,596 B2 * | 5/2006 | Reid | E21B 33/037 165/104.21 |
| 7,784,547 B2 * | 8/2010 | Reddy | E21B 36/003 137/375 |
| 8,006,763 B2 * | 8/2011 | Bath | F16L 1/26 166/302 |
| 8,267,166 B2 * | 9/2012 | Damsleth | F16L 53/002 165/181 |
| 8,424,608 B1 * | 4/2013 | Lugo | E21B 36/005 166/302 |
| 8,701,713 B2 * | 4/2014 | Bigex | F16L 53/002 137/341 |
| 8,919,450 B1 * | 12/2014 | Cruz | E21B 41/0007 166/338 |
| 2010/0051279 A1 * | 3/2010 | Baugh | E21B 17/015 166/302 |
| 2010/0139924 A1 * | 6/2010 | Abney | E21B 36/005 166/335 |

* cited by examiner

*Primary Examiner* — Matthew R Buck

(57) ABSTRACT

The method of remediating a blockage with a subsea pipeline by engaging two or more remediating sections with the pipeline while the remediating sections are in an open position, closing the two or more remediating sections around the pipeline, flowing a warmed fluid into the first of the one or more remediating sections, and allowing the warmed fluid to flow from the first of the remediating sections into a second of the two or more remediating sections.

22 Claims, 3 Drawing Sheets

METHOD OF SUBSEA PIPELINE BLOCKAGE REMEDIATION

TECHNICAL FIELD

This invention relates to the method of non-intrusive prevention and remediation of deposits within subsea pipelines by the installation of a housing around the pipeline to allow the pipeline's environment to be heated.

BACKGROUND OF THE INVENTION

The field of this invention is that of removing blockages in remote subsea pipelines, typically from a subsea oil or gas well, between offshore platform installations, or from an offshore platform to the shore.

Hydrates are a porous solid which is formed primarily of water with a mixture of gases. It is effectively similar to crushed ice. There is a tendency for hydrates to form in the pipelines departing from a subsea gas well, especially on well startup.

The temperature of seawater at depths will often approach 32 degrees F., with the temperature in non-flowing pipelines being the same. When a subsea pipeline valve is opened, the gas expansion can cause substantial additional cooling. In these cold and high pressure conditions, hydrates of the gas and water can form quickly.

Frequently when the hydrate forms, it forms a blockage. The blockage will be somewhat porous. At that time, a high pressure will exist on the upstream side and a lower pressure will exist on the downstream side of the blockage. This means that additional gas will move through the hydrate and expand and therefore cool as it does. This means that not only can the expansion of the gas keep the formed hydrate cool, but can literally continue to grow additional hydrate blockage.

It is difficult to tell where the hydrates are actually located in deep water pipelines, especially when the pipelines are buried. They will most often be immediately downstream of a subsea valve or after a low point in a pipeline where water was able to collect.

Hydrates formed like this can last for weeks or months, with a substantial loss of gas flow and therefore revenue to the owner of the pipelines and subsea wells.

Paraffin can form blockages in pipelines by building up on the inner diameter of the cold pipelines as relatively warm oil circulates out of an oil well and cools as it flows down a subsea pipeline. As the layers of paraffin builds up on the subsea pipeline inner diameter, the inner diameter of paraffin becomes smaller and smaller. Ultimately a pigging device intended to clean the paraffin will cause the paraffin to separate from the inner wall of the pipeline and become a plug. In some cases, the paraffin will release from the subsea pipeline inner wall without a pig and cause a blockage. In either case, if the pressure in the pipeline is enough to move the plug along the pipeline, it will continue to collect additional paraffin as it moves until the length of the blockage cannot be moved by the available pressure.

Some attempts have been made to enter the end of the pipeline with a somewhat flexible string of coiled tubing to get to the blockage and wash it out. This is an expensive operation, and in some cases the blockages can be 10-20 miles away and are simply too far for coiled tubing to reach. Removal of the blockages can be further complicated if the pipe has bends in it which can make the operations difficult if not possible. In some of these cases the pipelines are cut and the end lifted to the surface to allow entrance into the pipeline. This is done at great expense and with significant threat of environmental pollution.

U.S. Pat. No. 6,939,082 shows a prior art method of remediation which shows a portable shoe handled by a remotely operated vehicle (ROV) which lands on the top half of the pipeline and circulates warm or hot water over the top half of the pipeline. This provides a benefit of mobility, but is limited in length. Sometimes the hydrates can be very long and impractical for a shoe in the range of six feet long to practically remediate. It is difficult for this type system to remediate a hydrate at the bottom of the pipeline.

In spite of the tremendous cost of loss of production and generally knowing approximately where the hydrates are likely to form, there has been no solution to address this in a practical and economic way.

BRIEF SUMMARY OF THE INVENTION

The object of this invention is to provide a non-intrusive method of removing hydrate or paraffin buildups within subsea pipelines.

A second object of this invention is to provide a non-intrusive method of removing hydrate or paraffin buildups within subsea pipelines by heating the full circumference of the pipeline.

A third objective of this invention is to provide a non-intrusive method of removing hydrate or paraffin buildups within subsea pipelines by installing a shell around the pipeline to contain the warm or hot fluids from a source of warm or hot fluids.

Another objective of this invention is to provide a non-intrusive method of preventing hydrate or paraffin buildups within subsea pipelines by heating the local area before a likely hydrate causing event.

DETAILED DESCRIPTION OF THE INVENTION

Figure 1:
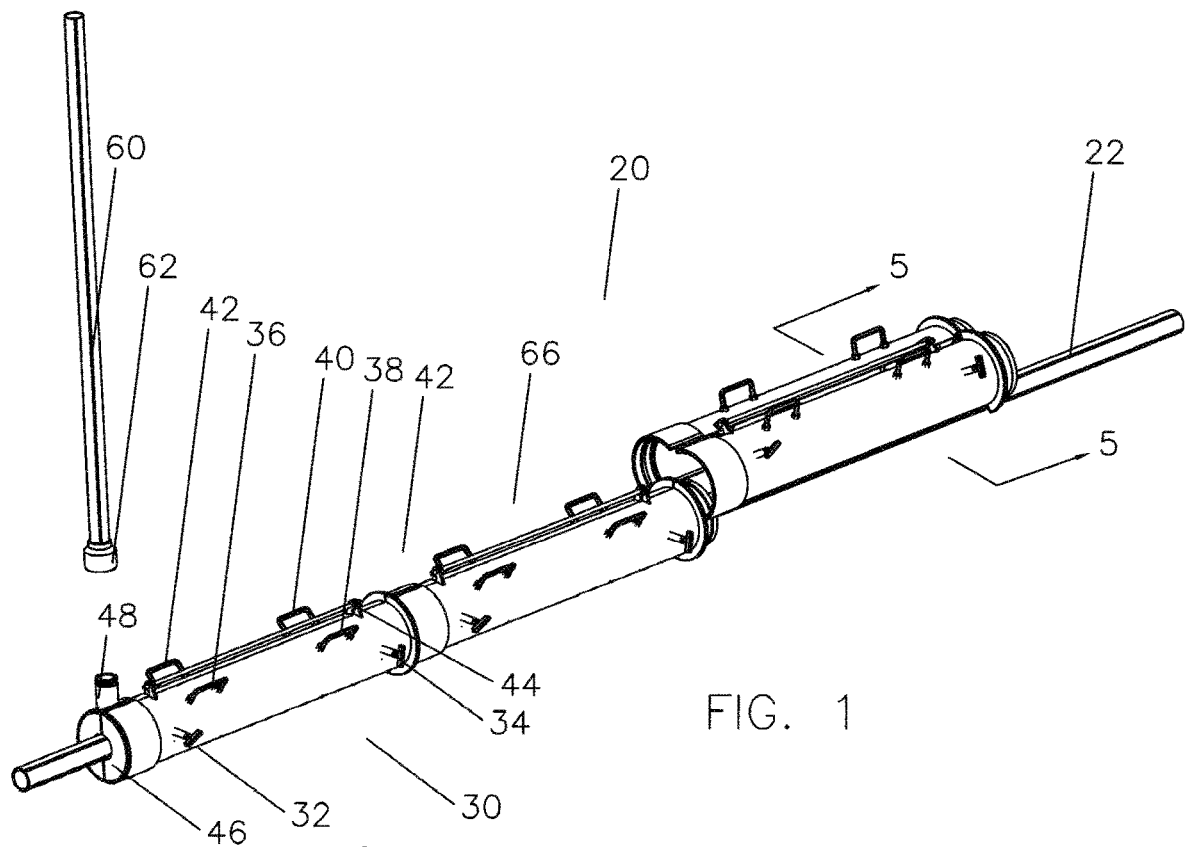
FIG. 1 is a view of a complete system for remediating a subsea pipeline using the methods of this invention.

Referring now to FIG. 1, a view of a complete system 20 for remediating a subsea pipeline 22 is shown partially installed on subsea pipeline 22 is shown. Starter section 30 is shown looked around pipeline 22 having setting handles 32 and 34, diver type D handles 36-42, hinge 44, closed end 46, and inlet 48.

Heated water supply 60 with end connection 62 will be engaged with inlet 48 to supply warm or hot water to heat the area inside starter section 30 and outside subsea pipeline 22. Closed end 46 will cause the supplied heated water to simply exit the end of starter section 30 on the opposite end. Heated water supply 60 can be a hose bring heated water from the surface or be representative of an ROV (remotely operated vehicle) or other tool which can generate the heated water subsea.

Intermediate section 66 engages starter section 30 to extend the length of the section of pipeline to be heated using the process. As many intermediate sections 66 can be added as desired. Intermediate section 66 does not have a separate inlet as it simply receives the excess warm water coming from starter section 30.

Figure 2:
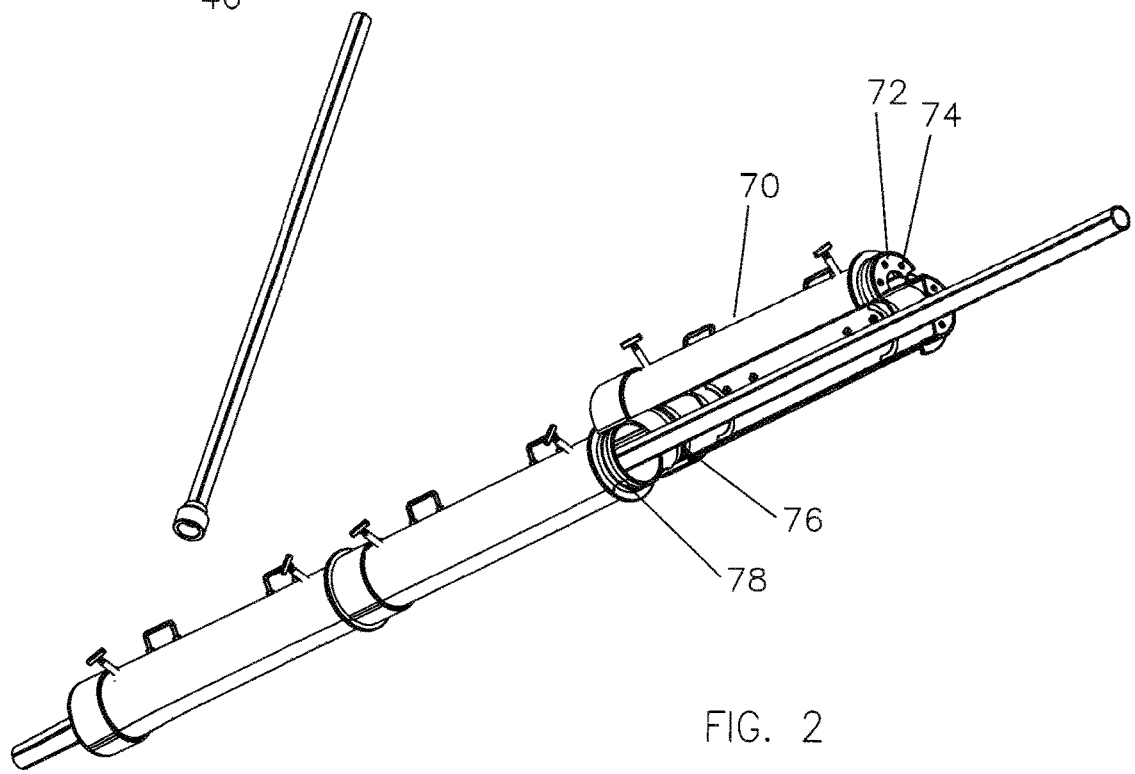
FIG. 2 is a view similar to FIG. 1 except from the bottom.

Referring now to FIG. 2, end section 70 is similar to intermediate section 66 except the end of it is not open as it is in intermediate section 66 but has a closed end 72 similar to closed end 46 of starter section 30 except it has circulation holes 74. Circulation holes 74 allow the warmed fluid from heated water supply 60 flow out the end, but tends to minimize subsequent convection circulation to cool the area within the sections.

Starting section 30 and intermediate sections 66 are shown fully installed around pipeline 22, and end section 70 is shown being installed. It will be lowered onto the pipeline 22 by divers or an ROV with a lip 76 on end section 70 engaging a groove 78 on intermediate section 66. This process will be described in greater detail in subsequent figures.

Figure 3:
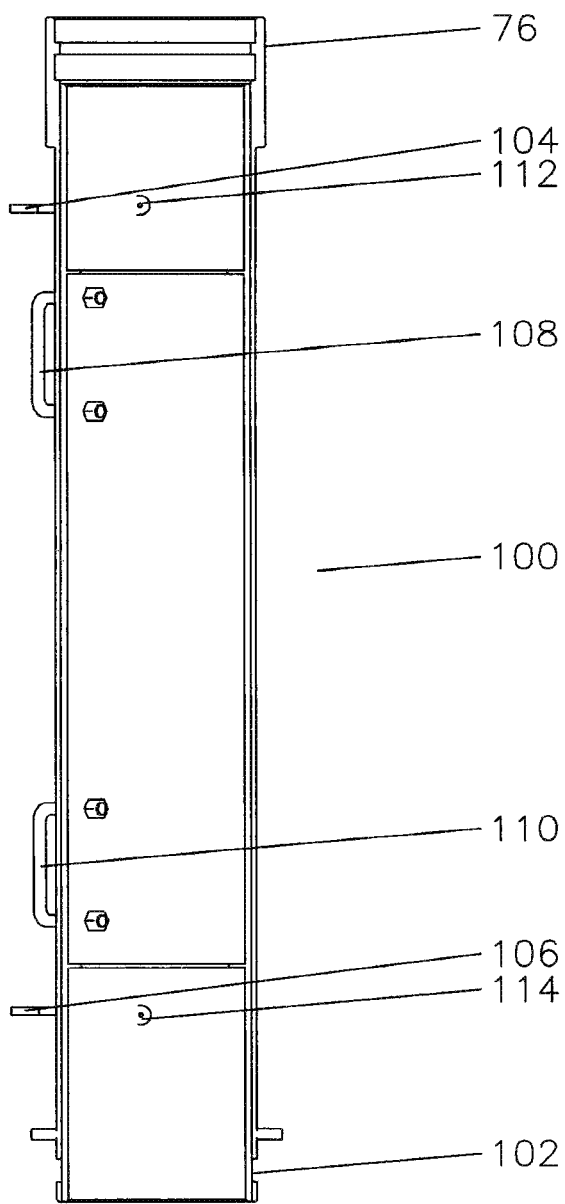
FIG. 3 is one half of an intermediate section of a device of this invention.

Referring now to FIG. 3 one half of an intermediate section 100 is shown with lip 76 being as seen in FIG. 2 and groove 102 being similar to groove 76 in FIG. 2. It also shows hinge halves 104 and 106, D handles 108 and 110, and holes 112 and 114 for actuating cables to be discussed.

Figure 4:
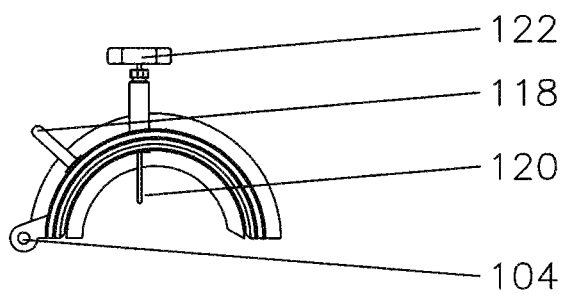
FIG. 4 is an end view of FIG. 3.

Referring now to FIG. 4, an end view of FIG. 3 is shown with a portion of release cable 120 and release cable handle 122 being shown.

Figure 5:
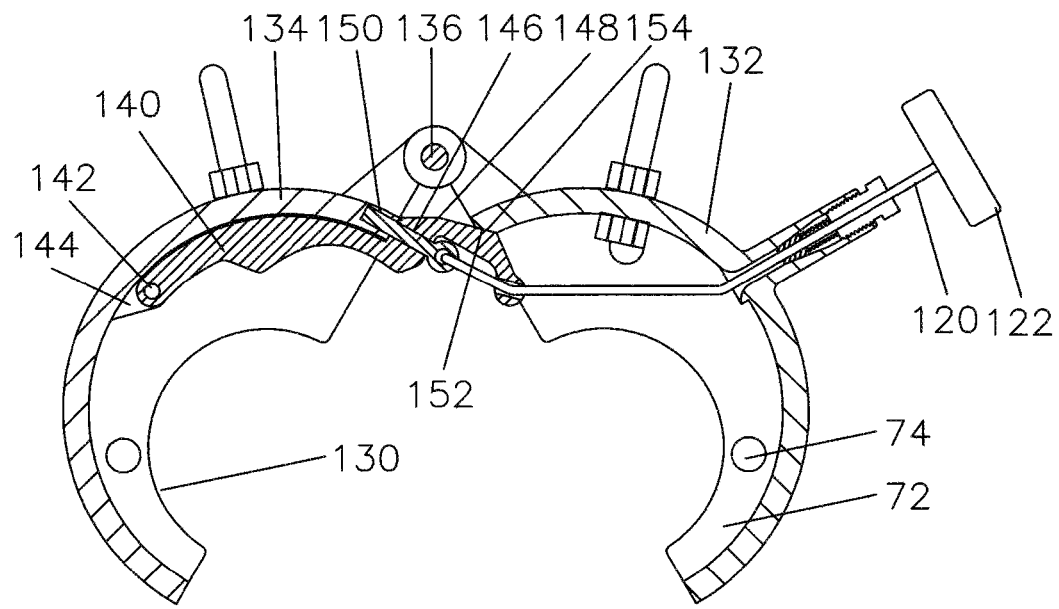
FIG. 5 is a section thru FIG. 1 at lines "5-5" showing the two halves of a remediating section in the open position.

Referring now to FIG. 5, a section thru FIG. 1 at lines "5-5" is shown showing bulkhead plate 72 with holes 74 and an inner diameter 130 which will be only slight larger than the pipeline 22 to be remediated. Housing halves 132 and 134 are hinged about hinge pin 136. Release plate 140 is hinged about hinge pin 142 which also engages mounting tab 144 which is mounted on housing half 134. Release plate 140 has a hole 146 which is engaged by release pin 148 which also engages hole 150 in housing half 134. Release plate 140 has angled shoulder 152 which engages angled shoulder 154 on housing half 132, causing the housing halves 132 and 134 to remain opened as illustrated.

When a diver or ROV pull release cable handle 122, tension on release cable 120 will pull release pin 148 from hole 150, allowing release plate 140 to pivot downwardly thereby allowing housing halves 132 and 134 to close together to make a full circle.

Figure 6:
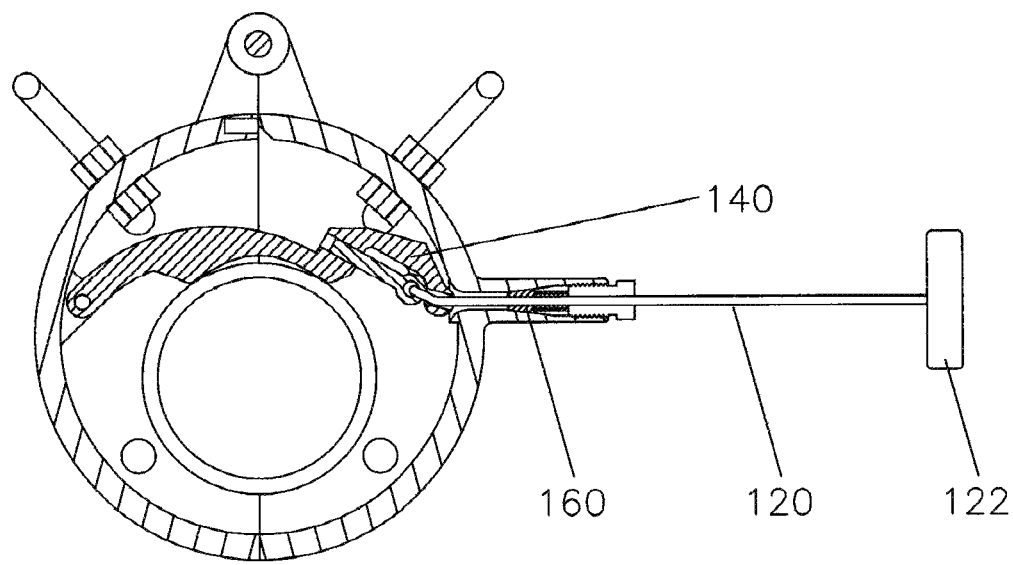
FIG. 6 is a section thru FIG. 1 at lines "5-5" except with the two halves of a remediating section moved to the closed position.

Referring now to FIG. 6, continued pull on release handle 122 will cause the release cable 120 to become tight and be locked in place by slip type grippers 160, retaining the tension in release cable 120 and keeping the housing halves 132 and 134 locked in place.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

SEQUENCE LISTING

N/A

That which is claimed is:

1. A method of preventing or remediating a blockage within a subsea pipeline, comprising
engaging two or more remediating sections with said pipeline while said remediating sections are in an open position,
closing each of said two or more remediating sections around said pipeline,
flowing a warmed fluid into and through a first of said two or more remediating sections, and
allowing said warmed fluid to flow from said first of said remediating sections into and through a second of said two or more remediating sections.

2. The method of claim 1 further comprising providing said flow of said warmed fluid with a hose from the surface of the sea or ocean.

3. The method of claim 1 further comprising providing said flow of said warmed fluid from a source which is subsea.

4. The method of claim 3 further comprising said flow of said warmed fluid is coming from a source which is subsea is a remotely operated vehicle.

5. The method of claim 1 further comprising holding said two or more remediating sections in the open position by a latch.

6. The method of claim 5 further comprising pulling on a handle to said latch and allow said remediating sections to move to a closed position.

7. The method of claim 5 further comprising pulling on a handle will release said latch and cause said remediating sections to move to a closed position.

8. The method of claim 1 further comprising a gripper retaining said remediation sections in a closed position.

9. The method of claim 8 further comprising providing, said gripper to retain said remediation sections in said closed position which grips on a flexible cable connected between a handle and a latch.

10. The method of claim 1 further comprising providing the first of said two or more remediating sections with a bulkhead on a first end to encourage said flow of warmed fluid towards the opposite end.

11. The method of claim 10 further comprising providing the first of said two or more remediating sections with one or more grooves on the outer surface of the opposite and providing the second of said two or more remediating sections with one or more lips on an inner surface on a first end,
such that when said second of said two or more remediating sections is closed around the first of said two or more remediating sections, said one or more lips engage said one or more grooves to connect said second of said two or more sections to said first of said two or more sections.

12. A method of preventing or remediating a blockage within a subsea pipeline, comprising
engaging two or more remediating sections with said pipeline while said remediating sections are in an open position,
closing each of said two or more remediating sections around said pipeline,
flowing a warmed fluid into and through a first of said two or more remediating sections, and
allowing said warmed fluid to flow from said first of said remediating sections into a second of said two or more remediating sections and out of the distal end of said second of said two or more remediating sections.

13. The method of claim 12 further comprising providing said flow of said warmed fluid with a hose from the surface of the sea or ocean.

14. The method of claim 12 further comprising providing said flow of said warmed fluid from a source which is subsea.

15. The method of claim 14 further comprising said flow of said warmed fluid is coming from a source which is subsea is a remotely operated vehicle.

16. The method of claim 12 further comprising holding said two or more remediating sections in the open position by a latch.

17. The method of claim 16 further comprising pulling on a handle to said latch and allow said remediating sections to move to a closed position.

18. The method of claim 16 further comprising pulling on a handle will release said latch and cause said remediating sections to move to a closed position.

19. The method of claim 12 further comprising a gripper retaining said remediation sections in a closed position.

20. The method of claim 19 further comprising providing said gripper to retain said remediation sections in said closed position which grips on a flexible cable connected between a handle and a latch.

21. The method of claim 12 further comprising providing the first of said two or more remediating sections with a bulkhead on a first end to encourage said flow of warmed fluid towards the opposite end.

22. The method of claim 21 further comprising providing the first of said two or more remediating sections with one or more grooves on the outer surface of the opposite end and providing the second of said two or more remediating sections with one or more lips on an inner surface on a first end, such that when said second of said two or more remediating sections is closed around the first of said two or more remediating sections, said one or more lips engage said one or more grooves to connect said second of said two or more sections to said first of said two or more sections.

\* \* \* \* \*